March 10, 1964  J. R. WEBSTER ETAL  3,124,032
IMPREGNATED BRAIDED PACKING AND METHOD OF MAKING THE SAME
Filed March 31, 1961

INVENTORS:
JAMES R. WEBSTER
GEORGE E. HOUGHTON
THEODORE L. VEIT
BY Robert Henderson
ATTORNEY

United States Patent Office 3,124,032
Patented Mar. 10, 1964

3,124,032
IMPREGNATED BRAIDED PACKING AND
METHOD OF MAKING THE SAME
James R. Webster, George E. Houghton, and Theodore L.
Veit, Palmyra, N.Y., assignors to Garlock Inc., Palmyra,
N.Y., a corporation of New York
Filed Mar. 31, 1961, Ser. No. 99,767
9 Claims. (Cl. 87—1)

This invention relates to braided packing for use in stuffing boxes of machinery as, for example, in an arrangement for packing a rotary shaft or reciprocating rod at a point where the shaft or rod extends through a packed opening into a part of a machine containing some fluid to be held therein against escape. More particularly, it relates to such a braided packing, thoroughly impregnated throughout its entire thickness, or throughout the entire braided thickness portion thereof, with finely divided particles of plastic material such as, for example, polytetrafluoroethylene (hereinafter referred to for convenience as "Teflon," by which designation it is known in the trade).

"Teflon" and some other plastic materials having certain characteristics in common such as low coefficient of friction, substantial heat resistance and chemical inertness to certain fluids which have a deleterious effect upon many impregnation materials previously used in packings may also present a common economic problem in that scrap pieces or particles of such materials are of extremely limited further use. This latter condition arises from the fact that "Teflon" and similar materials already developed or which may hereafter be developed are sintered in undergoing conditioning for initial use but may not be re-sintered to enable scrap of such materials to be employed. As several plastic materials having the mentioned common characteristics may be employed in practicing this invention, such plastic materials are generally referred to hereinafter, for convenience, merely as " 'Teflon'-like" material.

"Teflon," not previously sintered, has hitherto been used for impregnating packing material, but such "Teflon" is costly and does not function to the best advantage as a bearing material. Scrap " 'Teflon'-like" material is relatively inexpensive but is subject to very serious limitations as to its manner of use.

An important object of this invention is the provision of a braided packing in which the packing or at least the braided part thereof is thoroughly impregnated with previously sintered " 'Teflon'-like" material, which, ordinarily, would be such material that had previously undergone sintering in connection with a previous use.

Another important object of this invention is to produce a packing with improved wearing characteristics.

Another important object of this invention is to produce a packing that effectively dams the fluid being packed.

Another important object is the provision of a method of impregnating braided packing material with " 'Teflon'-like" scrap material.

Still another important object is th provision of a considerably increased field of use for " 'Teflon'-like" scrap material.

Other advantages and objects may appear from the present specification.

In practicing this invention in the manufacture of braided packing material, the mentioned pre-sintered material, after being ground to finely divided form, is mixed with other ingredients to form a preferably, rather thick paste. This paste is conveyed under pressure to a point in a braiding machine where it may be applied directly to plural strands of yarn which, while being formed into a braid, converge as the braid takes shape. Directly below the point of direct application of the paste to said strands is a cup or plate upon which any excess of the pressure-delivered paste drops to form a paste-mass. The cup or plate is so positioned that each strand or at least a substantial part of each strand comes into contact with the paste-mass or becomes momentarily immersed therein so that paste is wiped onto each strand and is carried by the strands into the entire body of the braid. After initial formation of the braid, the latter commonly is pulled through a die at which two things occur, (1) the compacting of the braid in the die serves to squeeze the paste thoroughly into the body of all strands of the yarn and into the interstices between the braided strands, and (2) any excess paste is wiped from the formed braid leaving a braid thoroughly impregnated and surfaced with "Teflon."

The drawing shows, for illustrative purposes, two types of braided packing according to this invention and one of various mechanical devices which may possibly be used to manufacture such packing.

Figure 1:
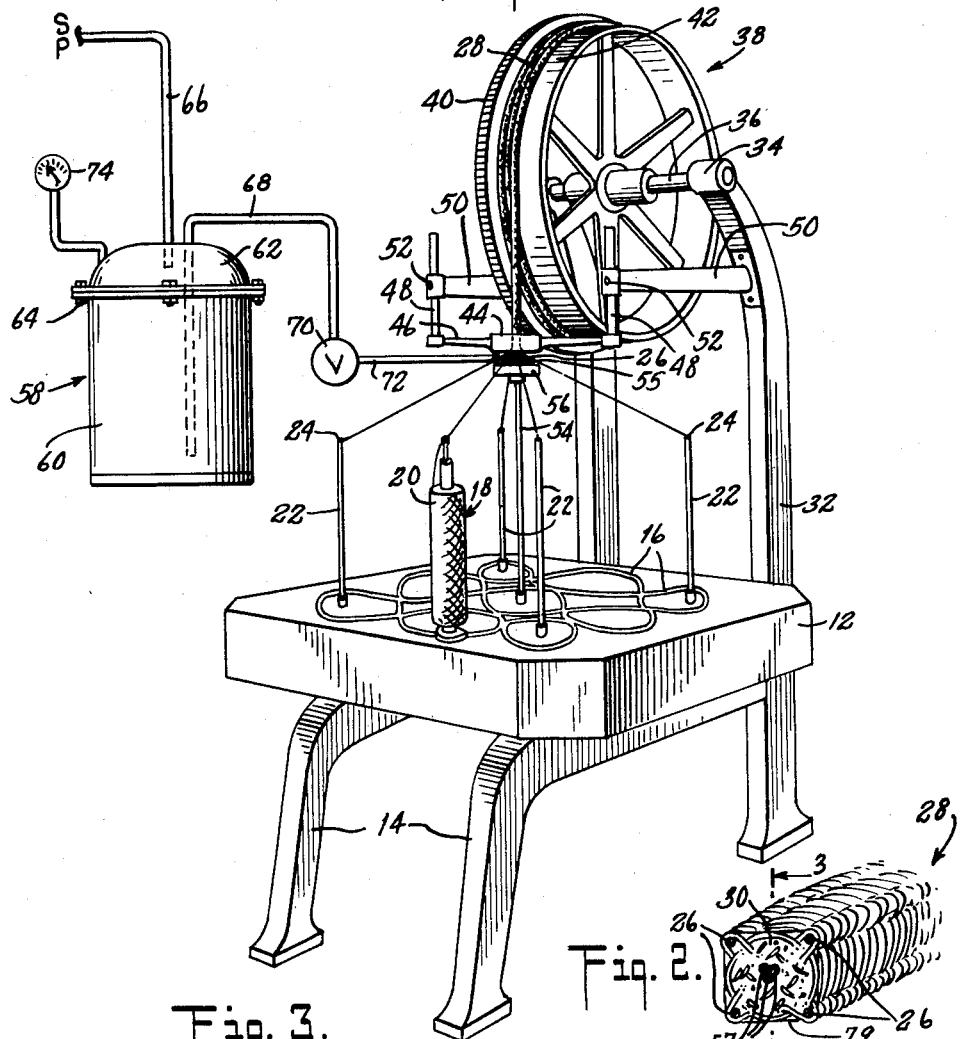
FIGURE 1 is a largely diagrammatic perspective view of mechanical means for making the subject braided packing.

The mentioned paste may include some virgin or unsintered "Teflon" powder but, preferably should include very little or not any of that costly powder. Thus, the "Teflon" included in the paste may preferably be entirely the relatively inexpensive scrap "Teflon" which has been finely divided by suitable means. The scrap "Teflon" to be used in the paste must, of course, first be ground or otherwise converted into powder. Although there may be some advantage in making this powder very fine, as, for example, to pass through 100 mesh to the inch screen, it has been found that it suffices, and minimizes costs, if the scrap "Teflon" is somewhat coarser, being reduced to a fineness of only about 40 mesh to the inch.

As the powdered scrap "Teflon," on the basis of present knowledge, cannot be dissolved, the paste should include a thickening agent of sufficient viscosity to hold the scrap powder in suspension; but the fully constituted paste should be of such consistency that it will readily wipe onto the yarn being braided. It has been found that methylcellulose (a powder available commercially as Methocel—4000 cps.), is a suitable thickening agent. It is also desirable to utilize a wetting agent to facilitate admixing the scrap "Teflon" powder in forming the paste. It has been found that a wetting agent commercially available as "Triton X-100" is suitable for the stated purpose. Initially, the paste contains a substantial volume of water, which, however, evaporates or is dried by heat. The braid is then calendered to its desired cross-sectional shape.

A preferred mixture to form the mentioned paste is:

| | Parts by weight |
|---|---|
| Methocel—4000 cps | 1.2 |
| Triton X-100 | 0.2 |
| Powdered scrap consisting of finely divided "Teflon" scrap (40 mesh) | 49.0 |
| Water | 49.6 |

A batch of the paste may be formed by heating about 3½ quarts of water to about 190° F. and adding about 14 ounces of Methocel with agitation while maintaining the water at that temperature. After the Methocel is added, continue to agitate for about five minutes, maintaining a temperature of about 190° F. Then the heat source is discontinued and about 13½ quarts of cold water is added while agitation continues. Upon the water in the mix becoming cooler, the Methocel becomes dissolved. Then, about 40 cc. of the Triton X–100 is admixed, whereafter about 35 pounds of the finely divided "Teflon" scrap is thoroughly admixed to produce the paste of the desired constituency and viscosity. Thus, the constituency of the formed batch it approximately in accordance with the indicated weight proportions.

Any suitable means may be provided, within this invention, for supporting the mentioned paste-mass in such association with the yarn strands being formed into braid, that all the strands will wipe upon or become momentarily immersed in the paste before becoming a part of the braid. One of various possible ways of thus bringing about this association of the paste and the yarn is illustrated in FIG. 1.

FIG. 1 shows a known form of braiding machine, but only in sufficient detail to afford an understanding of this invention. The machine comprises a flat table 12, mounted on footed supports 14, and formed with continuous slots 16 which define a more or less undulating path back and forth and in various directions across the table. Slidably mounted upon the table and at various spaced points along said slots are plural yarn carriers 18 (only one being shown), each including a roll 20 of yarn; and these carriers are positively moved upon the table in and under the guidance of said slots by suitable gear means (not shown) underneath the top of the table. Yarn drawn from these carriers becomes what may be termed the "braided yarn" of the finished braid.

Figure 2:
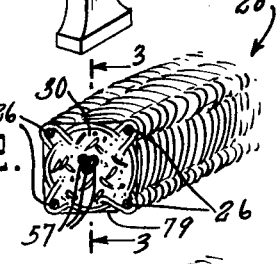
FIG. 2 is a fragmentary, cross-sectionalized view of braided packing according to this invention.

Means may also be provided for feeding some strands of yarn straight into the braid being formed. Such strands will extend in substantially straight lines longitudinally of the braid and may be termed "longitudinal strands"; and these longitudinal strands serve to limit the extensibility of the finished braid as well as to shape the braid into a square cross-section. The means for feeding these longitudinal strands into the braid are illustrated as similar corner masts 22 fixed upon the table near each of the latter's corners. Strands of yarn drawn from yarn rolls (not shown) beneath the table are drawn upwardly through eyelets 24 at the upper ends of the masts; these strands become longitudinal side strands 26 in the braid 28 as shown in FIG. 2, the braided yarn being indicated at 30 in said figure.

Extending rigidly from the back of the table are two uprights 32, each having at its upper end a bearing 34 which accommodates an axle or shaft 36 of a wheel 38 having an integral ring gear 40 by means of which, in association with other gears (not shown), the wheel 38 is positively rotated. The rim of the wheel 38 is in the form of a narrow drum 42 about which one or several turns of braid may extend and be tightened or loosened by means (not shown) to prevent slippage of the braid on the drum, and, hence, cause upward pull of the braid formed from the strands of yarn fed upwardly from the carriers 18 and the masts 22.

The strands of yarn, in passing upwardly from the carriers 18 and masts 22, are guided together through a braiding die 44 in a cross-member 46 having upwardly extending slide arms 48, adjustably slidable in suitable vertical bores in the outer ends of brackets 50, which are suitably fixed to the uprights 32. Set screws 52, at the ends of the brackets 50 serve to lock the cross-member 46 at any level to which it may be adjusted.

The mentioned yarn may, within this invention, be of any fibrous material heretofore used or which may hereafter be used in manufacturing braided packing.

As illustrated in FIG. 1, means for applying the mentioned paste to the yarn comprise a rigid central mast 54 fixed upon the top of the table 12, a preferably circular, paste-holding cup or plate 56 fixed upon the upper end of the mast 54 and means for delivering paste under pressure to a point directly above the cup or plate 56. Paste thus delivered may be applied directly to the yarn which is converging into a braid, any excess paste dropping onto the cup 56, thus forming, on the latter, a paste-mass 55. The mast 54 may be tubular and the plate 56 centrally apertured to enable a central, longitudinal strand or strands 57 (FIG. 2) to be drawn upwardly therethrough.

A suitable form of the mentioned pressure means for delivering the paste is illustrated as a conveniently located, pressurized paste container or tank 58 in the form of a body 60 having a sealed cover 62 removably held thereon by plural lug-fasteners 64, a pressure pipe line 66 connected to a suitable source SP of fluid pressure and to the tank 58 to establish and maintain fluid pressure in the latter, an output pipe line 68 connected to the tank and extending vertically within and to a bottom area of the latter, a valve 70 on the pipe line 68 to control the movement of paste from the tank through the latter pipe line, and a feed pipe 72 extending from the valve 70 and having an open end in position above the plate 56 and at about the level at which the strands of yarn move from the carriers 18 to the die 44. The tank, advantageously, is equipped with a pressure gauge 74.

The actual braiding operation proceeds in a well-understood, conventional manner. Combined with such operation, however, the described paste, exuding from the feed pipe 72 under pressure, may wipe directly onto the yarn strands converging upwardly immediately before they enter the die 44, any excess of the paste dropping onto the plate or cup 56 to constitute and add to the paste-mass 55. The plate 56 is so located that the strands of yarn, converging upwardly from the carriers 18, engage and/or become momentarily immersed in said paste-mass shortly before they pass upwardly into the die 44. As the strands drawn from the carriers 18 move about the edge of the plate 56, they wipe away any paste overhanging the edge of the plate, thereby opposing overflow of paste from said plate, assuming, of course, that the supply of paste is suitably controlled. Thus, the application of the paste to the strands may be of a dual nature, (1) by direct application from the pipe 72 and (2) by wiping from the mass 55.

Control of the supply of paste may be accomplished by suitable adjustment of the valve 70 and/or by adjusting the pressure-developing means at the source SP of fluid pressure. The gauge 74 indicates the preferred pressure after adjustments have yielded the preferred rate of paste flow and thereafter will indicate any departure from that preferred pressure.

As the paste-surfaced strands move upwardly toward and through the die 44, they become compacted into a braid 28 as a result of which the paste is squeezed substantially into the texture of each strand; additionally, all interstices within the braid become completely filled with the paste. The exterior of the braid also retains a paste coating and any excess paste is prevented by the die from passing through it and drops back into the mass 55.

After the braid-producing operations thus far described, the braid may be immersed in a "Teflon" suspensoid to give it a coating 79 of virgin or unsintered "Teflon" which more securely bonds the external sintered "Teflon" particles to the surface of the braid. The impregnated braid also undergoes a further operation (not illustrated) in which it is calendered to give it a relatively smooth surface and to establish its desired cross-sectional shape. The impregnated braid is given an air cure in a heated oven until the water constituent of the paste is dispelled from the braid, leaving the braid thoroughly impregnated with "Teflon."

After the water has been dispelled and the packing otherwise made ready for use, the indicated thickening agent, which still remains in the packing, serves as a binder which holds the "Teflon" particles evenly distributed throughout the braid and against escape therefrom.

Figure 3:
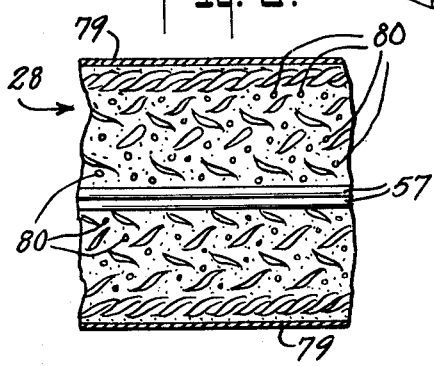
FIG. 3 is an enlarged, longitudinal sectional view of the packing taken on the line 3—3 of FIG. 2.

Thus, full advantage is taken of the filling, sealing, heat-resisting, inertness, and low-friction characteristics of "Teflon," while successfully making use of inexpensive scrap "Teflon" rather than costly virgin or unsintered "Teflon." Although the impregnation of the braid with particles of scrap "Teflon" is so thorough as to render it impracticable to distinctly illustrate those particles, nevertheless, they have at least been indicated in FIG. 3 by numerous dots at 80 in that figure.

Figure 4:
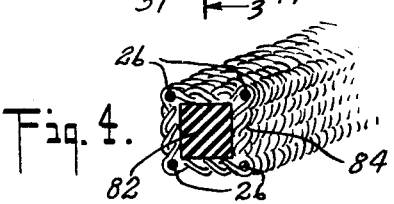
FIG. 4 is a view, of the same character as FIG. 2, but illustrating another form of packing according to this invention.

This invention may be utilized in or relating to packing which is not necessarily braided throughout its diameter. Thus, as illustrated in FIG. 4, a finished braided packing, within this invention, may have a core 82 of some plastic material, selected in accordance with the particular use in which the packing is to be employed. The braided portion 84, of course, would be thoroughly impregnated with finely divided scrap "Teflon," similarly to the impregnation indicated in FIG. 3.

It will be apparent that the present inventive concept may be utilized in various ways other than disclosed herein without, however, departing from the invention as set forth in the following claims.

We claim:

1. Braided packing material comprising an elongate braid of strands of fibrous material, said strands and interstices therebetween being thoroughly impregnated with impregnating material comprising finely divided sintered polytetrafluoroethylene.

2. Packing material according to claim 1, said finely divided sintered polytetrafluoroethylene constituting upwards of 95% of said impregnating material in the packing material when the latter is ready for use.

3. Packing material according to claim 1, said finely divided sintered polytetrafluoroethylene being of a fineness of between 40 and 100 (both inclusive) screen mesh to the inch.

4. A method of forming braided packing material thoroughly impregnated with finely divided sintered polytetrafluoroethylene, comprising preparing a paste which includes a substantial volume of said finely divided sintered polytetrafluoroethylene, intermixed with thickening material and water, and applying said paste to strands of yarn during the forming of the latter into an elongate braid.

5. The method according to claim 4, wherein the finely divided sintered polytetrafluoroethylene is of a fineness of between 40 and 100 (both inclusive) screen mesh to the inch.

6. A method of forming braided packing material thoroughly impregnated with finely divided sintered polytetrafluoroethylene, comprising preparing a pasty mixture of finely divided sintered polytetrafluoroethylene and water, into which thickening and wetting agents have been admixed, and applying said mixture to strands of fibrous yarn during the convergence of said strands in the formation of an elongate braid therefrom.

7. Packing material according to claim 1, said impregnating material further comprising a thickening agent uniformly distributed therethrough and serving as a binder holding the polytetrafluoroethylene evenly distributed throughout the braid and restraining the polytetrafluoroethylene against separation from the braid.

8. Packing material according to claim 7, said thickening agent being methylcellulose.

9. The method according to claim 4, wherein the volume of polytetrafluoroethylene in said paste is substantially greater than the volume of thickening material therein.

References Cited in the file of this patent

UNITED STATES PATENTS

| | | |
|---|---|---|
| 1,204,065 | Rahm et al. | Nov. 7, 1916 |
| 2,012,176 | Tevander | Aug. 20, 1935 |
| 2,025,038 | Cannon | Dec. 24, 1935 |
| 2,070,035 | Weiss | Feb. 9, 1937 |
| 2,134,324 | Brackett | Oct. 25, 1938 |
| 2,250,674 | McBurney | July 29, 1941 |
| 2,509,290 | Elvin et al. | May 30, 1950 |
| 2,547,348 | Alexander | Apr. 3, 1951 |
| 2,764,506 | Piccard | Sept. 25, 1956 |
| 2,930,106 | Wrotnowski | Mar. 29, 1960 |
| 2,976,257 | Dawe | Mar. 21, 1961 |
| 2,977,748 | Zisman et al. | Apr. 4, 1961 |
| 3,080,258 | Davis | Mar. 5, 1963 |